US012489937B2

(12) United States Patent
Brunel et al.

(10) Patent No.: US 12,489,937 B2
(45) Date of Patent: Dec. 2, 2025

(54) METHOD OF GENERATING A PERSONALIZED TELEVISION CHANNEL, CORRESPONDING DEVICE, SYSTEM AND COMPUTER PROGRAM

(71) Applicant: Orange, Issy-les-Moulineaux (FR)

(72) Inventors: Laurent Jean Brunel, Chatillon (FR); Louis Xavier Carbonnel, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 338 days.

(21) Appl. No.: 17/957,635

(22) Filed: Sep. 30, 2022

(65) Prior Publication Data

US 2023/0098728 A1 Mar. 30, 2023

(30) Foreign Application Priority Data

Sep. 30, 2021 (FR) ..................... 2110372

(51) Int. Cl.
*H04N 21/2668* (2011.01)
*H04N 21/258* (2011.01)
*H04N 21/262* (2011.01)

(52) U.S. Cl.
CPC ... *H04N 21/2668* (2013.01); *H04N 21/25891* (2013.01); *H04N 21/26241* (2013.01)

(58) Field of Classification Search
CPC ......... H04N 21/2668; H04N 21/25891; H04N 21/26241; H04N 21/4532
See application file for complete search history.

(56) References Cited

U.S. PATENT DOCUMENTS

2018/0041791 A1* 2/2018 Garcia Navarro .......................... H04N 21/4622
2018/0270522 A1 9/2018 Hwa

OTHER PUBLICATIONS

Preliminary Search Report for French Application No. FR 2110372, dated May 12, 2022.
Preliminary Written Opinion for French Application No. FR2110372, dated May 18, 2022.

* cited by examiner

*Primary Examiner* — Nathan J Flynn
*Assistant Examiner* — Christine A Kurien
(74) *Attorney, Agent, or Firm* — Knobbe, Martens, Olson & Bear, LLP (57) ABSTRACT

A method for generating a personalized television channel for a user of a terminal configured to access at least one audiovisual content broadcasting service is disclosed. The method includes obtaining user preference criteria in advance; for at least one given time slot, selecting, from the preference criteria obtained, an audiovisual content to be programmed on the personalized television channel, from among a plurality of audiovisual contents accessible from the terminal of the user by the at least one service; and on receipt of a request for access to the personalized television channel from the terminal of the user in the given time slot, transmitting access information to the selected audiovisual content to the terminal of the user, with a view to its playback by the terminal of the user as a program of the personalized channel.

10 Claims, 7 Drawing Sheets

METHOD OF GENERATING A PERSONALIZED TELEVISION CHANNEL, CORRESPONDING DEVICE, SYSTEM AND COMPUTER PROGRAM

CROSS-REFERENCE TO RELATED APPLICATIONS

This application claims foreign priority to French Patent Application No. FR 2110372, entitled "METHOD OF GENERATING A PERSONALISED TELEVISION CHANNEL, CORRESPONDING DEVICE, SYSTEM AND COMPUTER PROGRAM" and filed Sep. 30, 2021, the content of which is incorporated by reference herein in its entirety.

BACKGROUND

Field

The present development relates generally to telecommunications, and more specifically to access to audiovisual content. It applies in particular to user terminals and/or service equipments handling such content.

Description of the Related Technology

Today, there is a rich and varied offer of audiovisual content delivery services for a user.

Public or private television channels accessible via digital terrestrial television (DTT), cable television or satellite television offer traditional audiovisual programme schedules, which they broadcast in a time slot provided in the schedule. In addition, many of them now provide the user with a service for rebroadcasting audiovisual programmes in catch-up mode for a given period of time, for example one month after the broadcast date of the programme in the programme schedule. In this way, the user can still access in streaming mode an audiovisual content whose broadcast they have missed, whenever they wish during this period.

Some of these channels are called generalist, because they offer a variety of programmes, aimed at all types of audience and adapted to the time slot and the type of audience most represented in that time slot. Others are thematic, as they specialise in a particular theme, such as sport, travel, culture, news, young people, etc.

Faced with this vast choice of television channels, some service operators also offer the user the option of defining one as a favourite channel, for example by dedicating a button on a television remote control or a particular icon on a mosaic screen of the various channels. Such a configuration facilitates access to this channel by avoiding the need for the user to scroll through a list of available channels or to memorise a multi-digit channel number.

For some years now, there have also been audiovisual content distribution platforms that offer their subscriber users a large catalogue of audiovisual content, such as series, films or documentaries, available on demand.

It is understood that today the user has an offer of almost plethoric audiovisual content. This great diversity is interesting, but poses search and navigation problems in order to select, according to one's tastes and desires at the time, the best audiovisual content available at a given moment.

Moreover, a television channel offered by a service operator, whether thematic or generalist, never corresponds exactly to the expectations of a particular user.

The development improves the situation.

SUMMARY

The development responds to this need by providing a method for generating a personalised television channel for a user of a terminal configured to access at least one audiovisual content broadcasting service, said method comprising:
  obtaining user preference criteria in advance;
  for at least one given time slot, selecting, from the preference criteria obtained, an audiovisual content to be programmed on the personalised television channel, from among a plurality of audiovisual contents accessible from the terminal of the user by said at least one service, said selection being implemented by a decision module configured to detect in an image, text or sound data of said audiovisual content, from an analysis model previously constructed by machine learning, characteristics or events representative of the preference criteria of the user;
  programming of the selected content in the personalised television channel, on said time slot; and
  transmitting access information to the selected audiovisual content to the terminal of the user, with a view to its playback by the terminal of the user as a programme of the personalised channel.

The development provides a completely new and inventive approach to managing access to audiovisual content available to a user of one or more audiovisual content delivery services. It proposes to build a personalised television channel for the user according to the preferences of this user.

"Multimedia content" means digital content that contains at least one image, text or sound data item. Multimedia content can be received as a broadcast (streaming, TV channel, radio, etc.) or stored on a medium (hard disk, database, server, etc.).

"Preference criteria" means a characteristic or set of characteristics related to audiovisual content that define a preference or taste of the user for that audiovisual content. For example, a theme, such as sport, travel, cinema, etc., a film genre, such as comedy, thriller, etc., a level of violence or action depending on the time of day or the day of the week, an actor in the film, etc.

With the development, the user can define a theme of their own, such as "Europe car" or "sport without football", or expand the definition of a theme offered by a theme channel, such as "deep sea exploration and travel".

More precisely, the development consists in selecting for a given time slot and among the audiovisual content accessible at that time the audiovisual content most likely to please the user and programming it in a programme schedule of the personalised channel.

According to the development, the method comprises learning an analysis model of the audiovisual content available to the user from the preference criteria and the selection of the audiovisual content implements an automatic decision module based on said analysis model.

Advantageously, the development is based on a machine learning technique to build a data model configured to detect, in an image, a text, an audio data of the audiovisual content, characteristics or events representative of the preference criteria of the user and allowing the selection of the best audiovisual content available for the user according to their stated preferences and/or their past usage by relying on an elaborate and efficient data model.

When the user requests to view their personalised channel, for example by pressing a dedicated button on their remote control or by clicking on an icon of that channel, the user terminal receives access information to the selected audiovisual content for playback on a screen of the terminal of the user, such as a programme of the personalised television channel.

In this way, the user does not have to navigate through the entire audiovisual offer available, in particular they do not have to zap through all the television channels, in order to choose the audiovisual content that they like best. On the contrary, the personalised channel offers them audiovisual content chosen especially for them, which they can access effortlessly.

Advantageously, the method also comprises obtaining a history of use of audiovisual content by the user of the service and the selection takes account of this history.

"Audiovisual content usage history" means all audiovisual content that the user has viewed or listened to from any of their terminal equipment, either partially or completely. A usage history includes information related to each usage or consumption of content, including information related to the content delivery service used, e.g. the channel or service platform, the identification of the content, the time of viewing, the number of times it has been viewed or listened to, etc.

The development applies to any type of service for accessing audiovisual content. For example, the user has subscribed to a digital television channel broadcasting service and/or to a service for rebroadcasting programmes of said digital television channels in catch-up mode and/or to a video-on-demand service.

According to another aspect of the development, the access information for the selected audiovisual content in the given time slot comprises at least one identifier of the selected audiovisual content and an identifier of the service on which said audiovisual content is accessible.

The access information in question is intended to allow the terminal of the user to access the selected audiovisual content. For example, the access identifier for the selected content is an identifier of the television channel that scheduled it in the given time slot or an access information for the content in a video on demand catalogue or an access information for the content in a list of audiovisual content accessible by catch-up.

According to yet another aspect of the development, said selection is implemented for a plurality of time slots during a phase prior to receipt of an access request, the method comprises the recording of the scheduling information of the selected content over the plurality of time slots in an audiovisual programme schedule dedicated to the personalised channel and transmitting the programme schedule to the terminal of the user.

According to at least one embodiment of the development, the construction of the personalised channel is generated in a preliminary phase and its programme schedule is made available to the user.

One advantage is that the user can know in advance about the programming proposed by their personalised channel. Another advantage is that when they request access to audiovisual content scheduled on their personalised channel, it is delivered without latency.

According to yet another aspect of the development, the selection of the audiovisual content is implemented upon receipt of a request for access to the personalised channel in a current time slot.

According to this embodiment of the development, the construction of the personalised channel is done on demand, i.e. when the user effectively requests access to this channel.

It is therefore a partial construction, on the time slot or slots during which the user requests to watch their personalised TV channel. One advantage is that it does not implement calculations unnecessarily and therefore saves calculation resources.

According to another aspect of the development, the plurality of audiovisual content available to the user belongs to a group comprising at least:
  audiovisual content scheduled to be broadcast in at least one television schedule accessible to the user;
  audiovisual content already broadcast by a television channel accessible to the user but still available for rebroadcast;
  audiovisual content accessible to the user on demand.

One advantage is to exploit the full diversity of the audiovisual offer available to the user via the various broadcast services to which they have access.

According to yet another aspect of the development, the method comprises for at least one audiovisual content transmitted on the personalized television channel of the user, obtaining information of conformity of the audiovisual content to the preference criteria of the user and updating the analysis model from said at least one evaluation information obtained for the transmitted audiovisual content.

The user evaluates the proposed audiovisual content and this evaluation indicating the suitability of the audiovisual content scheduled on the personalised channel is used to evolve the data model used by the automatic decision system. The learning of the decision module is therefore done on the fly from an annotated history of the usage of the customised channel by the user. In this way, the selection process evolves over time to adapt more finely to the tastes and expectations of the user.

With the development, the user benefits from programming chosen especially for them on their personalised television channel. The programmed audiovisual content has been selected from the plurality of audiovisual content available to the user on the different services to which they have subscribed. All they have to do is to zap on their personalised channel to access, from their terminal, the content selected for them by the development on one of the broadcasting services available to them, as if it were content programmed by their personalised channel.

According to this aspect of the development, by obtaining information on the conformity of the content to the preference criteria of the user and transmitting said information to said service equipment, feedback from the user is taken into account to evolve the process of generating the personalised television channel and to refine the programming of the audiovisual content on this channel.

The development also relates to a device for generating a personalised television channel for a user of a terminal configured to access at least one audiovisual content broadcasting service, said device being configured to implement:
  obtaining user preference criteria in advance;
  for at least one given time slot, selecting, from preference criteria obtained, an audiovisual content to be programmed on the personalised television channel, from among a plurality of audiovisual contents accessible for this user by said at least one service on the given time slot, said selection being implemented by a decision module configured to detect in an image, text or sound data said audiovisual content, from an analysis model previously constructed by machine learning, characteristics or events representative of the preference criteria of the user;

programming of the selected content in the personalised television channel, on the said time slot; and transmitting access information to the selected audiovisual content to the terminal of the user with a view to its playback on the terminal of the user as a programme of the personalised channel.

Advantageously, said device configured to implement the steps of the method for generating a personalised television channel as described above, in its different embodiments.

Advantageously, said device is integrated in an item of service equipment involved in the implementation of at least one service for broadcasting audiovisual content to a user.

Advantageously, said service equipment is comprised in a system for broadcasting a personalised television channel to a terminal of a user in a telecommunications network, said terminal being configured to access at least one audiovisual content broadcasting service.

The system, the service equipment item and the device for generating a personalised television channel have at least the same advantages as those conferred by the above-mentioned generation method.

The development also relates to a computer program product comprising program code instructions for implementing the method as described previously, when it is executed by a processor.

A program can use any programming language, and can be in the form of source code, object code, or intermediate code between source code and object code, such as in a partially compiled form, or in any other desirable form.

The development also relates to a computer-readable storage medium on which is saved a computer program comprising program code instructions for implementing the steps of the methods according to the development as described above.

Such a storage medium can be any entity or device able to store the program. For example, the medium can comprise a storage means, such as a ROM, for example a CD-ROM or a microelectronic circuit ROM, or a magnetic recording means, for example a mobile medium (memory card) or a hard disk or SSD.

On the other hand, such a storage medium can be a transmissible medium such as an electrical or optical signal, that can be carried via an electrical or optical cable, by radio or by other means, so that the computer program contained therein can be executed remotely. The program according to the development can be downloaded in particular on a network, for example the Internet network.

Alternatively, the storage medium can be an integrated circuit in which the program is embedded, the circuit being adapted to execute or to be used in the execution of the above-mentioned method.

According to one embodiment, the present technique is implemented using software and/or hardware components. In this context, the term "module" may be used in this document to refer to a software component, a hardware component or a combination of hardware and software components.

A software component is one or more computer programs, one or more subroutines of a program, or more generally any element of a program or software capable of implementing a function or set of functions, as described below for the module concerned. Such a software component is executed by a data processor of a physical entity (terminal, server, gateway, set-top-box, router, etc.) and is able to access the hardware resources of this physical entity (memories, recording media, communication buses, electronic input/output cards, user interfaces, etc.). Hereafter, resources are understood to be any set of hardware and/or software elements that support a function or service, whether individually or in combination.

In the same way, a hardware component is any element of a hardware assembly capable of implementing a function or set of functions, as described below for the module concerned. It may be a programmable hardware component or a component with an embedded processor for executing software, for example, an integrated circuit, a smart card, a memory card, an electronic card for executing firmware, etc.

Each component of the system described above naturally implements its own software modules.

The various embodiments mentioned above can be combined with each other for the implementation of the present technique.

BRIEF DESCRIPTION OF THE DRAWINGS

Other purposes, features and advantages of the development will become more apparent upon reading the following description, hereby given to serve as an illustrative and non-restrictive example, in relation to the figures, among which.

DETAILED DESCRIPTION OF CERTAIN ILLUSTRATIVE EMBODIMENTS

The principle of the development is based on the generation of a personalised television channel for a user of one or more audiovisual content broadcasting services, from preference criteria collected for this user, and on making this personalised channel available to the user.

More precisely, this generation implements, for at least one given time slot, the selection, at least from preference criteria and optionally a usage history of the broadcasting service or services by this user, of an audiovisual content from among a plurality of audiovisual contents available to this user on the given time slot.

Upon receipt of a request for access to the personalised television channel from the user in the given time slot, access information to the audiovisual content programmed on the personalised channel is transmitted to the terminal of the user, so that it can retrieve the data streams of the audiovisual content, decode them and play them back to the user on a display device, as if it were a programme of that personalised channel.

The development therefore proposes to provide the user with a virtual television channel, generated from all the audiovisual content accessible to the user, and whose programme schedule has been specifically constructed for this user according to their tastes.

The development applies to any type of audiovisual content delivery or broadcasting service implemented in any type of telecommunications network, to a user of terminal equipment connected to that network and configured to access that service.

"Multimedia content" means digital content that contains at least one image, text or sound data item. Multimedia content can be received as a broadcast (streaming, TV channel, radio, etc.) or stored on a medium (hard disk, database, server, etc.).

The development is particularly applicable to audiovisual content broadcasting service(s) implemented by a same service operator. Indeed, the issues of user access rights to such or such audiovisual content are managed in a centralised manner by the operator.

However, it also applies where the user has subscribed to several audiovisual content broadcasting services with different operators and to an Internet access service which offers them an interface for managing their access rights to this service for each broadcasting service. In this way, the development can generate a personalised television channel for the user from audiovisual content from these different broadcast services.

Figure 1:
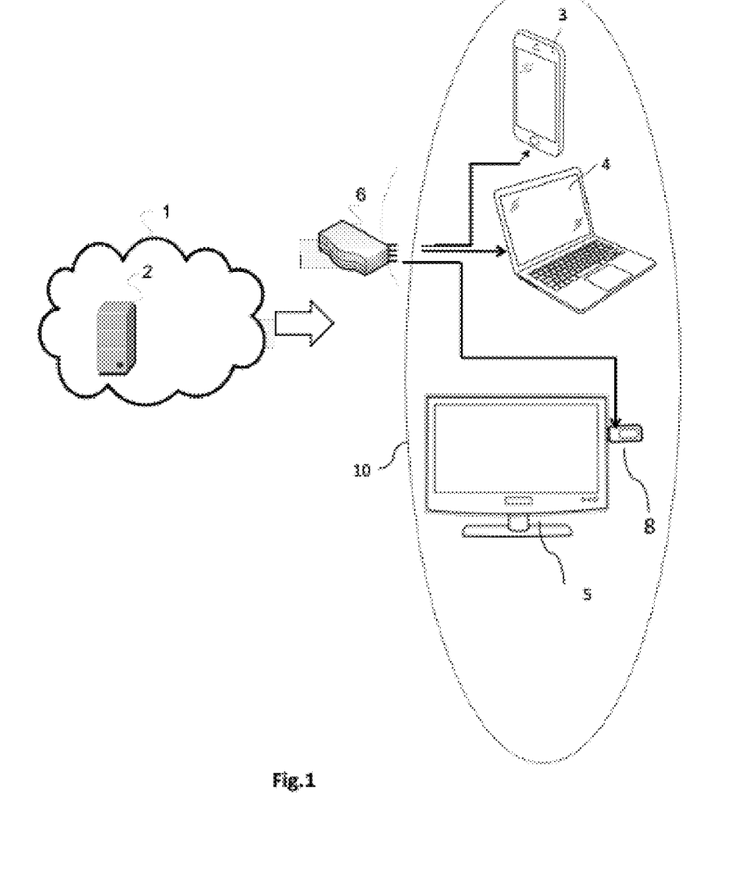
FIG. 1: diagrammatically shows an exemplary context of implementation of the development.

FIG. 1 shows the general context of an embodiment of the development, in which a telecommunication system comprises a first Local Area Network (LAN, 10) and a Wide Area Network (WAN, 1). According to this non-restrictive example, the LAN is a home network and the WAN is an Internet network. More broadly, the LAN 10 could be a corporate network and the WAN 1 could be of any type (cellular, GSM—Global System for Mobile Communications, UMTS—Universal Mobile Telecommunications System, Wifi—Wireless, DVB—Digital Video Broadcast, etc.) without falling outside the scope of the development.

The terminal 3, for example a smartphone, the terminal 4, for example a laptop computer, and the terminal 5, for example an HDMI key 8 connected to a television set TV, are located in this example in the local area network (LAN, 1) controlled by a home gateway 6. The context of the local area network is given as an example and could easily be transposed to a "best effort" type Internet network, a corporate network, etc.

A service equipment item 2, involved in the implementation of at least one service S for broadcasting digital audiovisual content, for example a digital content server, is located in the wide area network (WAN, 1) but it could indifferently be located in the local area network (LAN, 10), for example in the home gateway 6 or any other equipment able to host such a content server. The content server 2 receives, for example, digital television content channels from a broadcast television network, not shown, and/or videos on demand and/or digital television content available for rebroadcast in catch-up mode and makes them available to the client terminals.

A local area network, also referred to hereafter as a home network, is a computer network that links together, with or without wires, the terminal equipment, or more simply terminals, of a house (computers, printing and storage devices, connected objects, etc.), which are able to communicate with each other. Such a home network may include router equipment, also commonly known as a gateway, which is an intermediary element that redirects, or routes, data packets between the various terminals and networks connected to it. A user of such a network can perform a given service on a given terminal with its own characteristics (e.g. viewing multimedia content C).

Without loss of generality, the multimedia content C can be derived from a DVB network, IP, etc. It is recalled that a DVB (acronym for Digital Video Broadcast) digital broadcast network has an underlying infrastructure which may be supported by satellite (SAT), digital terrestrial television or cable, not shown. Alternatively or in an additional manner, the terminals could also be connected to a DVB-IP network, also known as IPTV, that is, ensuring the broadcasting of digital television or the provision of content, for example in VOD (Video on Demand) from the Internet network under the control of a service operator ensuring the quality of the delivery (for example, the TV of an operator, associated with a digital decoder and a home gateway of the same operator). In both cases, the multiplexed digital content is received by a digital decoder, also known as an STB (or "Set Top Box"), via appropriate reception media (antennas, cables, ADSL, etc.) and the different digital content is de-multiplexed and decoded before being played back on the terminals (e.g. TV sets) connected to the STB. Such a decoder, not shown in FIG. 1, may be associated with the gateway or directly integrated into the terminal. The terminal can also be designed to access content streamed from the WAN or LAN without downloading. In this case, we speak of "connected" television, i.e. the terminal can be connected to the Internet network so as to provide a range of services to users. If the delivery is not under the control of a service operator, this is also referred to as OTT content (Over The Top). OTT television allows a user of a terminal connected to the Internet to play digital channels or web content on the television set. Typically, this type of "connected" terminal interfaces with the gateway in charge of the local area network of the user to access a content server in the wide area network. Finally, such a terminal can access digital content from within the local network, for example from a streaming device associated with a local hard disk (not shown). In the following, multimedia content is used interchangeably for content received from a broadcast network (DBV, IPTV), OTT, and/or via a download (streaming, file download, etc.).

Figure 2:
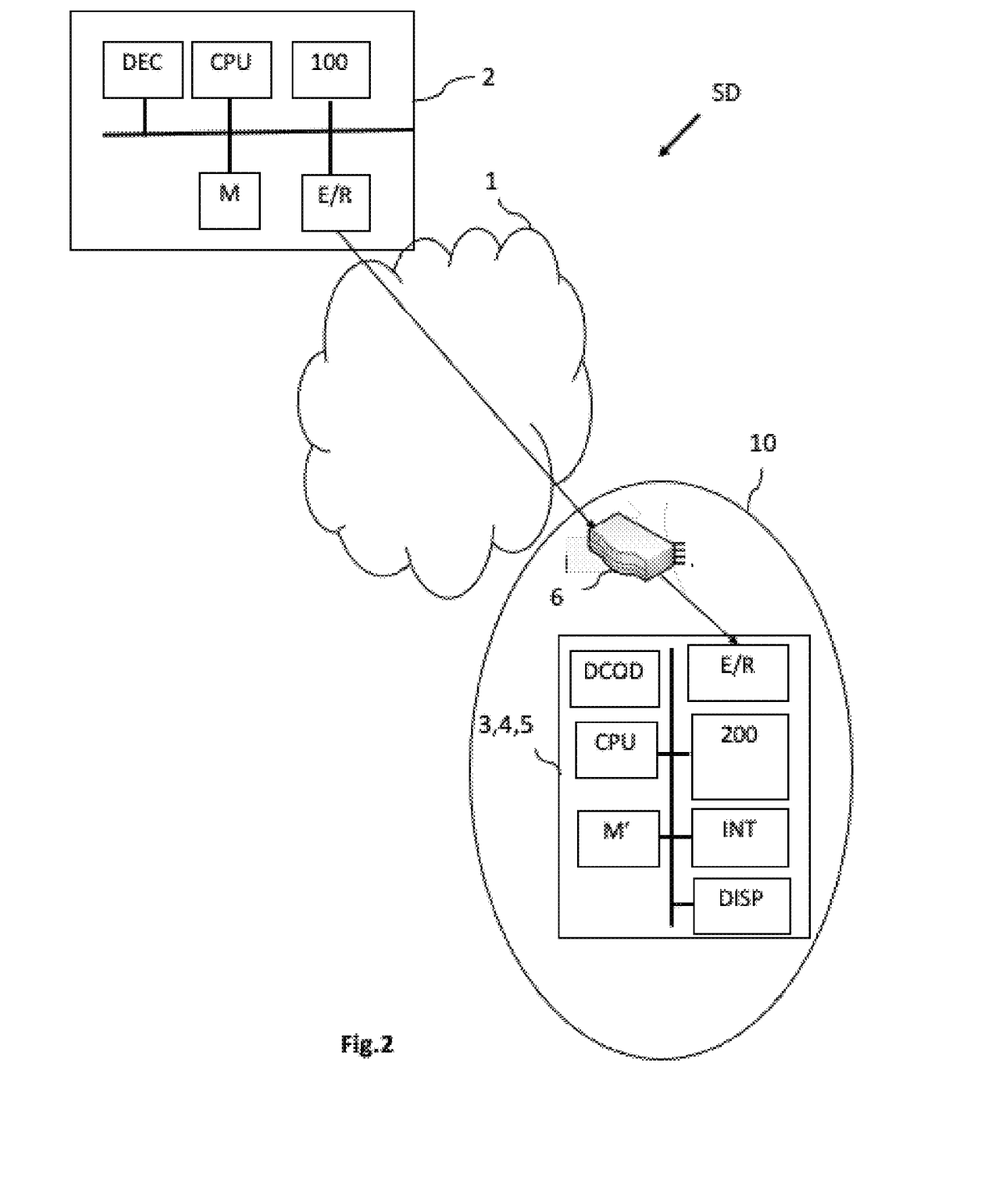
FIG. 2: diagrammatically shows an architecture example of a device for generating a personalised television channel and a device for processing a request for access to this personalised channel according to an embodiment of the development.

FIG. 2 represents an architecture of a service equipment item according to an embodiment of the development, for example the server equipment item 2 of FIG. 1.

It comprises, typically, memories M associated with a CPU. The memories can be of type ROM (Read Only Memory), RAM (Random Access Memory) or Flash. The service equipment item 2 communicates with the Internet wide area network 1 and in particular with other service equipment (not shown) involved in the implementation of the relevant digital content delivery service or services. It also communicates with the client terminal 3, 4, 5 via the residential gateway 6 through a transmission-reception module E/R.

According to this embodiment of the development, the server equipment comprises a device 100 for generating a personalised digital television channel for the user of the client terminal 3, 4, 5. Such a device is configured to obtain the preference criteria of the user in advance. Optionally, it also obtains a usage history of the audiovisual content delivery service or services. According to the development, the device 100 is also configured to select, for at least one given time slot, from the preference criteria obtained and optionally from the usage history, an audiovisual content from among a plurality of audiovisual contents available for that user on said time slot and, on receipt of a request for access to the personalised television channel from the user in the given time slot, to transmit to the terminal of the user information for access to the selected audiovisual content, so that it can play it back to the user as a programme of the personalised channel.

The collected preference criteria and usage history can be stored for example in the memories M of the server equipment item 2 or in an external memory hosted by another equipment item of the telecommunications network WAN 1.

Advantageously, the device 100 is configured to implement the construction by learning an analysis model of the plurality of audiovisual content accessible to the user according to the preference criteria of the user and to select the audiovisual content by implementing an automatic decision system based on the analysis model.

It is also configured to store access information to the audiovisual content selected to be scheduled in the time slot given by the personalised television channel and to transmit it to the terminal of the user.

Advantageously, it is also configured to obtain an information of conformity of this audiovisual content to the preference criteria of the user and to update the analysis model from said at least one evaluation information item obtained for the transmitted audiovisual content.

Figure 3:
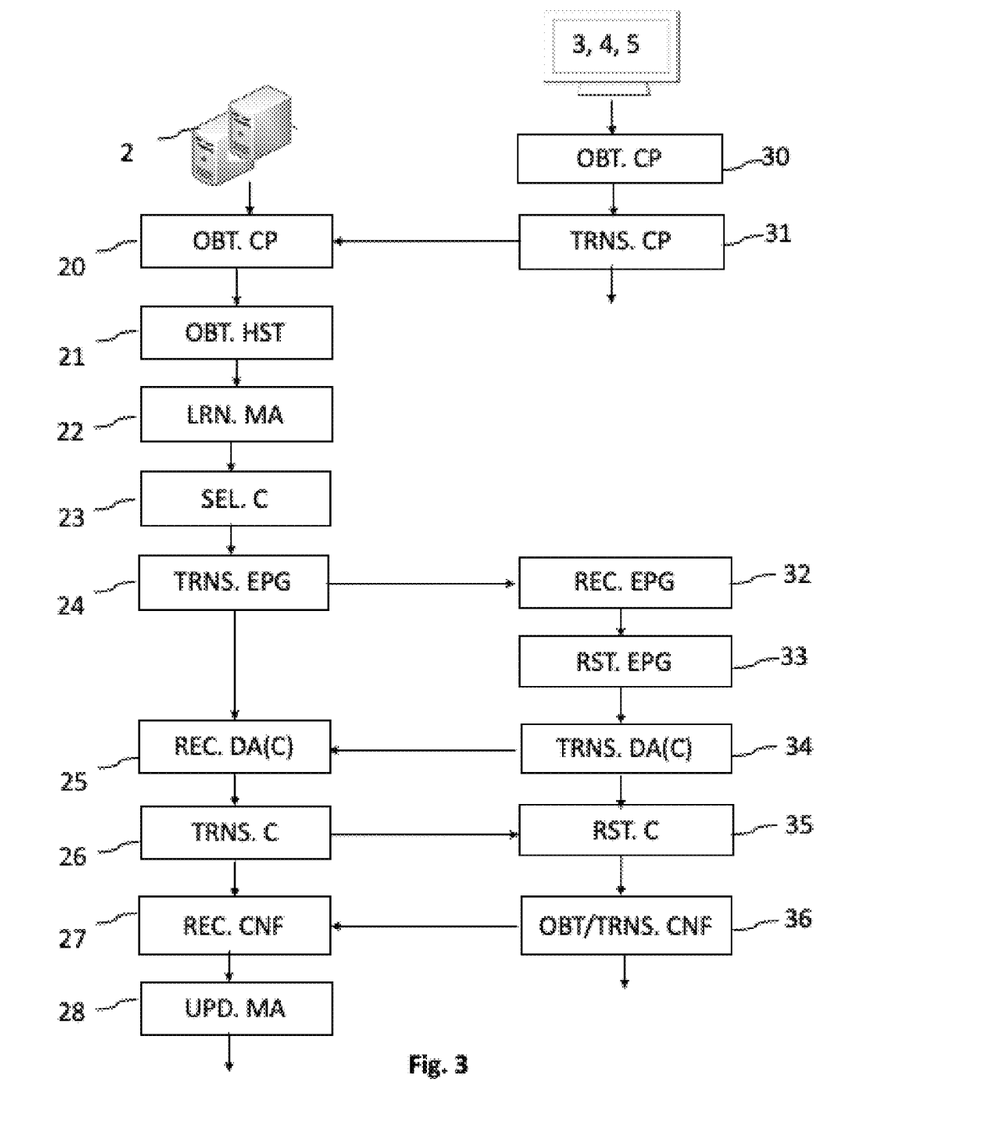
FIG. 3: described in the form of a flowchart of the steps in a process for generating a personalised television channel and a process for processing a request for access to this personalised channel, according to a first embodiment of the development.
Figure 4:
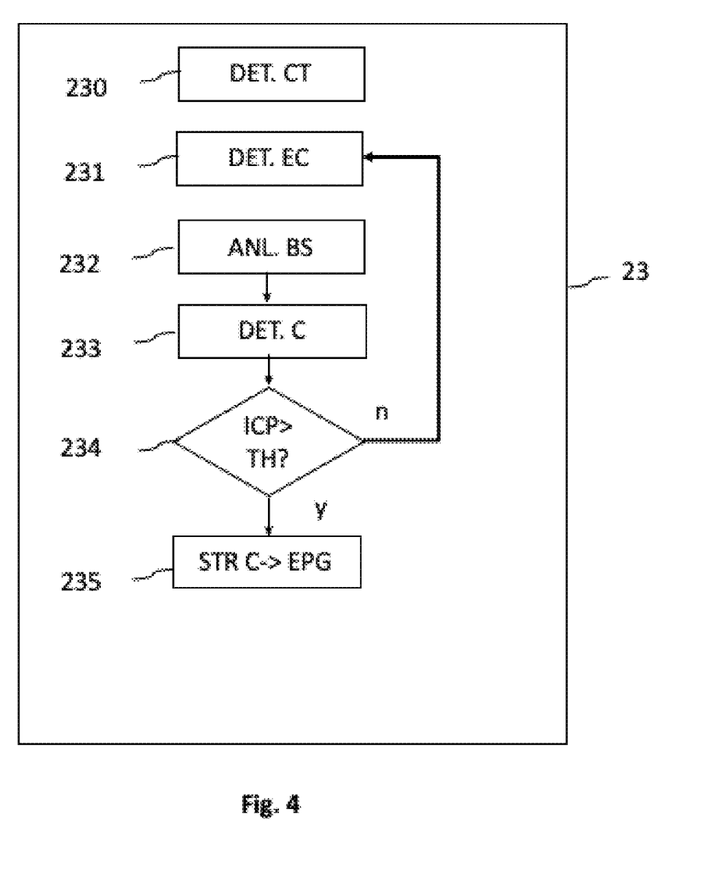
FIG. 4: details the selection of an audiovisual content to be programmed on the personalised television channel, among the plurality of audiovisual content accessible to the user according to an embodiment of the development.
Figure 5:
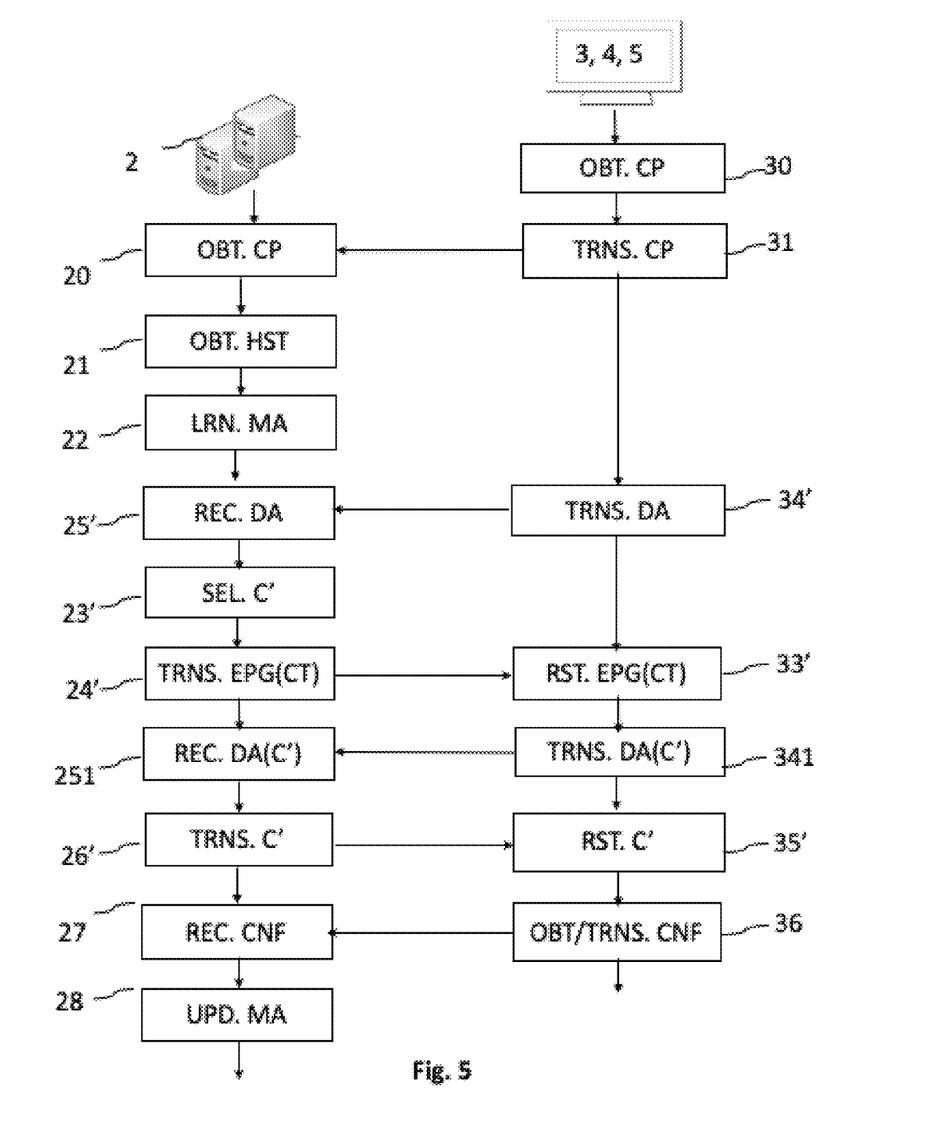
FIG. 5: described in the form of a flowchart of the steps in a process for generating a personalised television channel and a process for processing a request for access to this personalised channel, according to a second embodiment of the development.

The device 100 thus implements the method for generating a personalised television channel according to the development that will be detailed hereafter in relation to FIGS. 3 to 5.

Alternatively, the device 100 may be independent of the server equipment item 2, but connected to it by any link whatsoever, wired or not. For example, it is integrated with another equipment item of the telecommunications wide area network 1, such as another service equipment item. According to another embodiment of the development, it can be integrated into an equipment item of the local area network LAN 10, for example the gateway 6.

FIG. 2 shows an architecture of a terminal equipment item 3, 4, 5 according to an embodiment of the development. This can be for example the television set 5 of FIG. 1.

It comprises, typically, memories M' associated with a processor CPU. The memories can be of type ROM (Read Only Memory), RAM (Random Access Memory) or Flash. The terminal equipment communicates with the home gateway 6 and accesses the Internet wide area network 1 via this gateway 6, which enables it to communicate with service equipment such as the server 2, involved in the implementation of the audiovisual content broadcasting service in question. The terminal equipment item 5 communicates with the local area network LAN 10 with other equipment in the local area network and in particular with the gateway 6 through which it accesses the wide area Internet network 1 and in particular the service equipment item 2 involved in the implementation of the relevant audiovisual content broadcasting service. Advantageously, it also comprises a DCOD module for decoding coded data streams representative of an audiovisual content broadcast by the relevant service and an INT module for interfacing with the user through which, in particular, the latter selects a television channel or audiovisual content. This can be for example a remote control, a touch screen etc. Finally, it comprises a device DISP for displaying audiovisual content, such as a television set 5 or a monitor.

According to this embodiment of the development, the server equipment comprises a device 200 for processing an access request of the user to the personalised television channel. Such a device is configured to collect preference criteria of the user, transmit them to the server equipment item, transmit to the server equipment item 2 the request for access to the personalised television channel from the user, receive the information for access to the audiovisual content programmed by the personalised channel in the relevant time slot, and play back the audiovisual content to the user as a programme of the personalised channel, in response to said request.

The preference criteria are entered, for example, through the interface module INT. Once collected, they can be stored for example in the memories M' of the terminal equipment item 5 or in an external memory hosted by another equipment item of the local area network LAN 10.

Advantageously, the device 200 is also configured to obtain from the user, following the playback of the audiovisual content, information relating to a conformity of the content to the preference criteria of the user and to transmit said information to said service equipment item.

The device 200 thus implements the method for processing a request for access to the personalised channel according to the development that will be detailed hereafter in relation to FIGS. 3 to 5.

Alternatively, the device 200 may be independent of the terminal equipment item 5, but connected to it by any link whatsoever, wired or not. For example, it may be integrated with other terminal equipment in the local communication network, such as the home gateway 6.

In relation to FIGS. 3 to 5, in the form of flowcharts, embodiments of a process for generating a personalised television channel for a user (steps 20 to 28) and of a method of processing a request for access to said personalised channel of the user (steps 30 to 36), are now presented, according to an embodiment of the development.

In the following, the generation process is implemented by the aforementioned device 100 integrated in the server 2 and the processing process is implemented by the aforementioned device 200 integrated in the terminal 5. Naturally, the development is not limited to this embodiment, device 100 can be integrated into an equipment item in the local network LAN 10, such as for example gateway 6, and device 200 can be hosted by another equipment item in the local network LAN 10.

It is also assumed that the user of the terminal 5 accesses at least one audiovisual content broadcasting service of a service operator, for example a television channel broadcasting service 51. Optionally, they may also have access to a service S2 for rebroadcasting digital content already broadcast in catch-up mode and to a service S3 for renting video on demand, etc.

It is noted that access to each of these services may or may not be subject to prior subscription. In other words, the development applies equally to DTT channels and to paying content services, for example via video on demand platforms.

It is also assumed that server equipment item 2 contributes to the implementation of these different services.

In relation to FIG. 3, a first embodiment of the development is described according to which the personalised television channel is phase advance generated, i.e. independently of any user request for access to the personalised channel. For example, its programming is generated by receiving new programme schedules from the television channels of the service 51 and metadata describing the audiovisual content programmed in these new schedules.

In 30, the user terminal 5 obtains preference criteria CP from the user with a view to the generation of their personalised television channel. For example, it presents the user with a form, including questions, which the user fills in using the input interface INT, e.g. a touch screen, keyboard, remote control, etc.

The user terminal 5 transmits the preference criteria CP obtained in 31 to the server equipment item 2, which receives them in 20. It is noted that the latter may or may not have requested the sending of this information CP by the terminal 5.

Advantageously, these preference criteria CP comprise a plurality of characteristics of audiovisual content appreciated or preferred by the user. They therefore define one or more themes or subjects, such as sport, travel, cinema, etc., a type of content such as a film, a series, a documentary, a news programme, a film genre such as a comedy, a thriller, etc., a level of violence or action, one or more actors or presenters involved in the content, a time slot associated with a particular type of content, etc.

For example, they are stored in a memory M of the server equipment item 2, in association with a user identifier.

Optionally, in 21, the device 100 obtains a history HST of the usage or consumption of the user on the different services proposed by the operator. It is assumed, for example, that to do so, it requires access to such data from another service equipment item of the operator, who manages a database dedicated to storing these usage histories of the users.

The history HST gathers dated information on the audiovisual content that the user has viewed or listened to, at least partially, from the terminal equipment item 5 or another terminal configured to access the services of the operator, during a past time period. These include channel identifiers, programme identifiers, possibly a number of views or a percentage of content viewed, etc.

In the embodiment shown in FIG. 3, the method comprises in 22 the construction of an analysis model MA of preference criteria CP obtained by learning or training of an automatic decision module DEC. Optionally, the analysis of their content consumption history can complement and enrich the preference criteria CP explicitly provided by the user.

In this embodiment of the development, the module DEC is for example integrated into the server 2 or into another service equipment item, but, as a variant, it may also be located in the local network LAN 10 and for example integrated into the home gateway 6.

Once constructed, such an analysis model MA allows the module DEC, in an analysis phase, to select in 23, from a plurality of audiovisual contents available for that user in a given time slot, audiovisual content for the user, which corresponds to their preference criteria.

It is noted that the learning of the model MA and the analysis of audiovisual content using the model MA are presented here in two stages, or in two distinct phases, for simplicity. It is understood, however, that the learning can be carried out several times (e.g. in parallel or after the analysis) and that the analysis can be continuous.

Thus, in some embodiments, the learning may comprise an "upstream" learning phase (initial and prior to the analysis phase) to learn to detect/recognise features or events representative of the preference criteria stated by the user and to define parameters to enable subsequently, from any received audiovisual content, i.e. presented as input to the module DEC, to provide as output an indication of correspondence between the received content and at least one of the events processed by the learning.

The upstream learning phase is based on a learning base comprising audiovisual content, labelled or not, with characteristics and/or events representative of the themes and preferences stated by the user and possibly other themes and preferences not stated by the user. This content can be chosen for example by the operator, either manually or automatically.

The learning phase may also include learning the habits of the user over time from their usage history of the audiovisual content programmed by the personalised channel and, more generally, of the service S, in order to refine the settings resulting from the upstream learning. The two learning processes can be performed on the same device (e.g. on the server 2) or on different devices (e.g. the upstream learning can be performed on another service equipment, dedicated to this task, the downstream learning being performed by the server equipment item 2 or locally at the home gateway 6.

This learning phase is for example a machine learning phase ML. Machine learning, automatic learning, or statistical learning means the design, analysis, development and implementation of methods enabling a machine (in the broadest sense) to evolve through a systematic process, and thus to perform difficult or problematic tasks by algorithmic means. A possible example of machine learning is classification, where the aim is to label each item of data by associating it with a class.

According to at least one embodiment, a neural network is used, for example a deep learning network. In the learning stage, the network RN evolves to learn to recognise a set of characteristic elements that confirm the presence of an event in a content. For example, if it is wanted to teach the machine to recognise audiovisual content related to the theme of sport, it is presented with content in which sports actions, broadcasts of matches or sporting events, the presence of the public in the stands, a scoreboard, etc. appear, teaching it to find all the content that includes them. The same process can be applied to detection of the identity of an actor or a sportsperson, the identity of the team that scored, the recognition of a particular sport, a place, a city, certain forms of violence in content, a song, etc.

The learning phase provides an output data set (software, parameters, optimised neural network coefficients, etc.), which constitutes the analysis model MA.

Note that the neural network can be replaced by any artificial intelligence module capable of performing the same (or similar) functions: automatic learning by decision trees, statistical methods, logistic regression, linear discriminant analysis, genetic algorithms, etc.

In the analysis or decision phase, the audiovisual content programmed in the programme schedules of the various digital television channels available to the user in the given time slot are analysed by the module DEC, which is therefore configured to make a decision for each audiovisual content, for example by assigning it an ICP compatibility index with the preference criteria of the user, the value of this index increasing with the level of compatibility analysed.

In relation to FIG. 4, an embodiment of the selection step 23 is detailed.

In 230, a time slot CT is determined. This can be the current time slot or a future time slot, depending on whether the construction of the personalised channel is done on receipt in 25 of an access request from the user terminal 5 or in phase advance. In the example in FIG. 3, this is a future time slot.

In 231, a set of reference audiovisual content EC is selected. This choice naturally depends on the access rights of the user. It is assumed here that they have at least access to the digital television channel broadcasting service and that the set EC comprises the audiovisual content programmed by these digital television channels in the determined time slot CT as well as metadata associated with each of these audiovisual content and comprising information describing these contents.

In 232, the module DEC carries out an analysis of the audiovisual content of the set EC. Once analysed, the different contents are, for example, classed in descending order of compatibility index and the audiovisual content classed first is selected in 233 to be scheduled in the relevant time slot of the personalised channel's programme schedule.

Advantageously, a minimum threshold TH corresponding to a minimum value of the compatibility index is required for the selection of an audiovisual content on the time slot considered. Thus, the compatibility index ICP associated with the top classed content is compared in 234 to this threshold TH. If it exceeds this threshold, the content is selected, otherwise it is not selected.

When the content C is selected, an identifier of the selected audiovisual content and its original television channel are stored in memory in 235, together with the relevant time slot.

If, on the other hand, no audiovisual content among the audiovisual content scheduled by the digital television channels available to the user could be selected, the method changes the reference content set EC in 231 and repeats the analysis step 232 using the audiovisual content of this new set EC. Depending on the access rights of the user, this includes, for example, audiovisual content offered by the catch-up services of the same television channels. If an audiovisual content available in catch-up mode meets the compatibility conditions, it is selected in 233, 234, its identification information is stored in 235 in the programme schedule EPG of the personalised channel for the time slot CT.

Otherwise, another set of reference content EC is chosen. It is for example the catalogue of audiovisual content available on demand. Steps 231 to 235 are repeated until all possible content sets have been tested or content meeting the compliance criteria has been found.

Then another CT time slot is determined in 230 and steps 231 to 235 are repeated, until all time slots in the programme schedule are filled.

It is therefore assumed that the selection step is repeated for several time slots of a programme schedule, for example for the time slots of a day, a week or even a fortnight ahead, depending on the availability of the programme schedules of the television channels broadcast by the service S.

It is noted that if for one or more time slots, no audiovisual content meets the compatibility conditions, the development can offer the user to broaden their preference criteria, so as to allow a wider selection of content.

Following these selections, a programme schedule EPG of the personalised television channel of the user is constructed from the information stored in memory for each of the audiovisual content selected over the time slots in question and is made available to the user.

For example, the programme schedule is transmitted in 24 to terminal 5, which receives it in 32 and stores it in memory. Advantageously, the terminal 5 plays it back to the user when the latter requests information on the programming of their personalised channel. For example, they make this request simply by clicking on an icon dedicated to that channel on the television channel mosaic displayed on home screen of the television channel broadcasting service of the operator or by pressing the dedicated button on their remote control.

In this way, the user can see the programming of their personalised channel and in particular the audiovisual content programmed in the current time slot CT.

It is assumed that they request the access DA(C) to the audiovisual content C programmed in the current slot CT. Their access request DA(C) is transmitted by the terminal 5 of the user in 34 and received in 25. It comprises, for example, the identifier of the selected audiovisual content and, if applicable, the identifier of the television channel which has programmed it in the current time slot. In other words, the terminal 5 makes a typical request to access audiovisual content C to server equipment item 2, on the broadcast channel or at the address of the server that makes content C available, identical to the one it would make if the user had requested access to the original channel or had directly chosen the content C in catch-up mode. On receiving the data streams corresponding to the audiovisual content C required for the original channel of content C, it decodes them in the typical manner, and plays them back to the user in 35 as a programme of their personalised channel.

Once playback is complete, the terminal 5 requests the user in 36 to evaluate the audiovisual content they have just viewed, in particular its suitability for the preference criteria CP they have set for their personalised television channel. To do so, they provide information on compliance with these preference criteria CP, for example in the form of a score between 1 and 5.

The terminal 5 transmits the compliance information IC obtained to the service equipment item 2 which receives it in 27 and stores it in memory, for example in the memory M'.

Advantageously, the service equipment 2 triggers an update 28 of the learning of the analysis model MA of the audiovisual content on the basis of a history of the audiovisual content presented to the user on their personalised channel and of the compliance information CNF they have provided in return. In this way, the analysis model MA evolves over time by taking into account a history of audiovisual content programmed in the personalised television channel and effectively viewed by the user.

With reference to FIG. 5, an embodiment of the development is now detailed according to which the audiovisual content programmed on the current time slot CT by the personalised channel is selected on the fly. In other words, the programme of the personalised channel for the user is constructed on request.

It is noted that steps 20-22 and 30-31 are unchanged and will not be described further.

In 34', the terminal 5 transmits to the server equipment item 2 an access command to the personalised channel in the current time slot. It is received in 25' and triggers the selection 23' of an audiovisual content among the audiovisual content available to the user. Except for the fact that this step is implemented in real time and for the current CT time slot only, it is identical to the previously described step 23 and will not be detailed further.

It is assumed that an audiovisual content C' has been selected. The information EPG(CT) relating to this audiovisual content programmed on the personalised channel of the user, for example its identifier and, if necessary, the identifier of the original television channel or of the service making it available (catch-up or video on demand for example) is transmitted in 24' to the terminal 5 which receives it in 33'. More generally, this information includes all the information necessary for the terminal 5 to request access to content C'.

For example, the terminal 5 plays it back to the user so that they can decide whether or not to view the programmed content C'.

It is assumed that the user confirms their choice to view this content C'.

Using this information, the terminal 5 requests in 341 access to the content C' in the typical manner from the service which initially proposed it. On receipt of this request at 251, the server equipment item 2 transmits the content C' to the terminal at 26', then the terminal 5 plays it back to the user at 35' as if it were a programme from their personalised channel.

The steps 36, 27, 28 of collecting an evaluation from the user following the viewing of the content C', of reception by the server equipment item 2 and of taking it into account for updating the analysis module, are unchanged.

Figure 6:
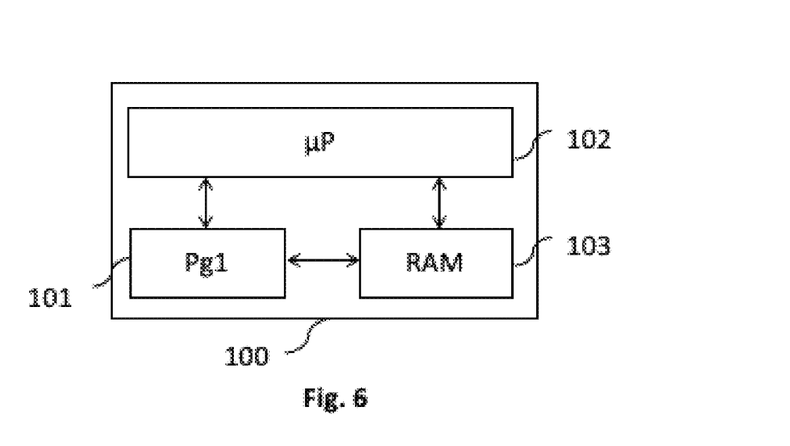
FIG. 6: describes an example of a hardware structure of a device for generating a personalised television channel according to the development.

In relation to FIG. 6, an example of the material structure of a device 100 for generating a personalised television channel for a user of a multimedia content access service is now presented, comprising a module for obtaining preference criteria of the user, a module for selecting, for at least one given time slot, from the preference criteria and the usage history obtained, an audiovisual content from among a plurality of audiovisual contents available to this user on said time slot, a module for receiving a request for access to the personalised channel from the user on the given time slot and a module for making the selected audiovisual content available on said personalised television channel.

The term "module" can correspond to a software component as well as to a hardware component or a set of hardware and software components, a software component itself corresponding to one or more computer programs or sub-programs, or more generally, to any element of a program capable of implementing a function or set of functions.

More generally, such a device 100 comprises a random access memory 103 (a RAM memory, for example), a processing unit 102 equipped for example with a processor and controlled by a computer program Pg1, representative of the modules for obtaining, selecting, receiving and making available, stored in a read-only memory 101 (a ROM memory or hard disk, for example). At initialisation, the code instructions of the computer program are for example loaded into a volatile memory 103 before being executed by the processor of the processing unit 102. The random access memory 103 may also contain the preference criteria of the user and a programme schedule of the personalised television channel.

FIG. 6 only shows a particular one of several possible ways of realising the device 100, so that it executes the steps of the method for generating a personalised television channel for the user as detailed above, in relation to FIGS. 3 to 5 in its various embodiments. Indeed, these steps may be implemented indifferently on a reprogrammable computing machine (a PC computer, a DSP processor or a microcontroller) executing a program comprising a sequence of instructions, or on a dedicated computing machine (for example a set of logic gates such as an FPGA or an ASIC, or any other hardware module).

In the case where the device 100 is realised with a reprogrammable computing machine, the corresponding program (i.e. the sequence of instructions) can be stored in a removable (such as, for example, an SD card, a USB flash drive, CD-ROM or DVD-ROM) or non-removable storage medium, this storage medium being partially or totally readable by a computer or a processor.

The various embodiments have been described above in relation to a device 100 integrated into a server equipment item 2 of telecommunications network WAN 1 of an operator, but it may also be integrated into a home or professional gateway 6 for access to this network WAN 1 and configured to manage a local area network LAN 10 to which the terminal equipment item or items 3, 4, 5 of the user is connected.

Figure 7:
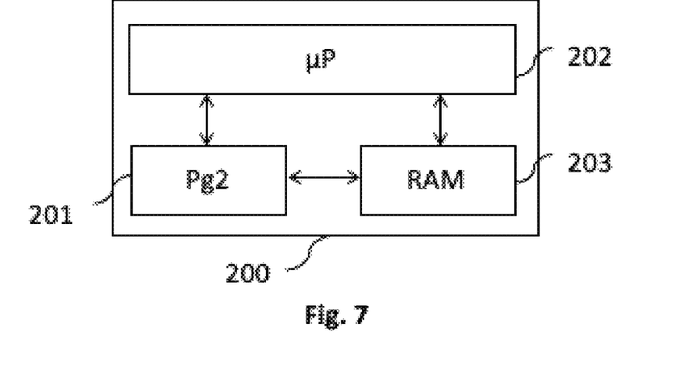
FIG. 7: describes an example of a hardware structure of a device for processing a request for access to this personalised channel according to the development.

In relation to FIG. 7, an example of the material structure of a device 200 for processing a request for access to a personalised television channel for a user of an access service to audiovisual content is also described, comprising a module for transmitting to a service equipment item involved in the implementation of the preference criteria service of the user, said service equipment item being configured to generate a personalised audiovisual programme channel for the user from said preference criteria and said usage history, a module for transmitting to the service equipment item a request for access to the personalised television channel on a given time slot from the user and a module for playing back to the user the audiovisual content programmed on the given time slot by the personalised television channel.

The term "module" can correspond to a software component as well as to a hardware component or a set of hardware and software components, a software component itself corresponding to one or more computer programs or sub-programs, or more generally, to any element of a program capable of implementing a function or set of functions.

More generally, such a device 200 comprises a random access memory 203 (a RAM memory, for example), a processing unit 202 equipped for example with a processor and controlled by a computer program Pg2, representative of the modules for obtaining and transmitting, stored in a read-only memory 201 (a ROM memory or hard disk, for example). At initialisation, the code instructions of the computer program are for example loaded into a volatile memory 203 before being executed by the processor of the processing unit 202. The random access memory 203 may also contain the preference criteria obtained from the user and a programme schedule of the personalised television channel.

FIG. 7 only shows a particular one of several possible ways of realising the device 200, so that it executes the steps of the processing method as detailed above, in relation to FIGS. 3, 4 and 5 in its various embodiments. Indeed, these steps may be implemented indifferently on a reprogrammable computing machine (a PC computer, a DSP processor or a microcontroller) executing a program comprising a sequence of instructions, or on a dedicated computing machine (for example a set of logic gates such as an FPGA or an ASIC, or any other hardware module).

In the case where the device 200 is realised with a reprogrammable computing machine, the corresponding program (i.e. the sequence of instructions) can be stored in a removable (such as, for example, an SD card, a USB flash drive, CD-ROM or DVD-ROM) or non-removable storage medium, this storage medium being partially or totally readable by a computer or a processor.

The development that has just been described in its different embodiments has many advantages. By selecting for a user the best audiovisual content from a plurality of audiovisual contents available in one or more given time slots, it generates for that user a virtual and personalised television channel, based on their preferences and possibly their previous usage. The user only has to go to their personalised television channel to access directly the audiovisual content chosen for them, without effort or tedious research. Thanks to the feedback proposed to the user, the programming of their personalised channel evolves over time to adapt better to their desires and expectations.

With the development, the user can thus define their own thematic channels and even a family channel whose programming would be adapted to the uses of the household and would take into account rules for the protection of minors. For example, the programmes broadcast from 4 p.m. onwards would be cartoons or other content suitable for young people, and the evening programmes would be films, series or reports popular with the whole family.

The invention claimed is:

1. A method of generating a personalized television channel for a user of a terminal configured to access at least one audiovisual content broadcasting service, the method comprising:
    obtaining user preference criteria in advance;
    for at least one given time slot, selecting by a decision module, from the preference criteria obtained, an audiovisual content to be programmed on the personalized television channel, from among a plurality of audiovisual contents accessible from the terminal of the user by the at least one service;
    obtaining image, text or sound data of the audiovisual content;
    detecting, with an analysis model previously constructed by machine learning, characteristics or events representative of the preference criteria of the user by the decision module based on the image, text or sound data of the audiovisual content from the analysis model the selection being implemented by a decision module configured to detect in an image, text or sound data of the audiovisual content, from an analysis model previously constructed by machine learning, characteristics or events representative of the preference criteria of the user;
    programming of the selected content in the personalized television channel, on the time slot; and
    transmitting access information to the selected audiovisual content to the terminal of the user, with a view to its playback by the terminal of the user as a program of the personalized channel.

2. The method according to claim 1, wherein the access information for the selected audiovisual content in the given time slot comprises at least one identifier of the selected audiovisual content and an identifier of the service on which the audiovisual content is accessible.

3. The method according to claim 1, wherein the selection is implemented for a plurality of time slots during a phase prior to receipt of an access request, the method comprises a recording of the scheduling information of the selected content over the plurality of time slots in an audiovisual program schedule dedicated to the personalized channel and transmitting the program schedule to the terminal of the user.

4. The method according to claim 1, wherein the selection of the audiovisual content is implemented upon receipt of a request for access to the personalized channel in a current time slot.

5. The method according to claim 1, wherein the plurality of audiovisual contents available to the user belongs to a group comprising at least:
    audiovisual content scheduled to be broadcast in at least one television schedule accessible to the user;
    audiovisual contents already broadcast by a television channel accessible to the user but still available for rebroadcast; and
    audiovisual contents accessible to the user on demand.

6. The generation method according to claim 1, wherein the method comprises for at least one audiovisual content transmitted on the personalized television channel of the user, obtaining information of conformity of the audiovisual content to the preference criteria of the user and updating the analysis model from the at least one conformity information obtained for the transmitted audiovisual content.

7. A device for generating a personalized television channel for a user of a terminal configured to access at least one audiovisual content broadcasting service, the device being configured to implement:
    obtaining user preference criteria in advance;
    for at least one given time slot, selecting, from the preference criteria obtained, an audiovisual content to be programmed on the personalized television channel, from among a plurality of audiovisual contents accessible for this user by the at least one service on the given time slot, the selection being implemented by a decision module configured to detect in an image, text or sound data of the audiovisual content, from an analysis model previously constructed by machine learning, characteristics or events representative of the preference criteria of the user;
    programming of the selected content in the personalized television channel, on the given time slot; and
    transmitting access information to the selected audiovisual content to the terminal of the user, with a view to its playback on the terminal of the user as a program of the personalized channel.

8. A service equipment item involved in the implementation of at least one broadcasting service of audiovisual content to a user, the service equipment item comprising the device for generating a personalized television channel for the user according to claim 7.

9. A system for broadcasting a personalized television channel to a terminal of a user in a telecommunications network, the terminal being configured to access at least one broadcasting service of audiovisual content, the system comprising at least one device for generating a personalized television channel according to claim 7.

10. A processing circuit comprising a processor and a memory, the memory storing program code instructions of a computer program for implementing the method according to claim 1, when the computer program is executed by the processor.

* * * * *